(12) United States Patent
Yoon

(10) Patent No.: US 11,089,176 B2
(45) Date of Patent: Aug. 10, 2021

(54) CONTROL OF APPS PROVIDING SAME OR SIMILAR SERVICES IN IMAGE FORMING DEVICE SUPPORTING MULTIPLE PLATFORMS

(71) Applicant: Hewlett-Packard Development Company, L.P., Spring, TX (US)

(72) Inventor: Jung Hyeon Yoon, Seongnam-si (KR)

(73) Assignee: Hewlett-Packard Development Company, L.P., Spring, TX (US)

(*) Notice: Subject to any disclaimer, the term of this patent is extended or adjusted under 35 U.S.C. 154(b) by 0 days.

(21) Appl. No.: 16/961,764

(22) PCT Filed: Jul. 19, 2018

(86) PCT No.: PCT/KR2018/008151
§ 371 (c)(1),
(2) Date: Jul. 13, 2020

(87) PCT Pub. No.: WO2019/142984
PCT Pub. Date: Jul. 25, 2019

(65) Prior Publication Data
US 2021/0067655 A1    Mar. 4, 2021

(30) Foreign Application Priority Data
Jan. 18, 2018  (KR) .................. 10-2018-0006665

(51) Int. Cl.
*H04N 1/00*    (2006.01)

(52) U.S. Cl.
CPC ..... *H04N 1/00938* (2013.01); *H04N 1/00244* (2013.01); *H04N 1/00411* (2013.01); *H04N 1/00437* (2013.01); *H04N 2201/0094* (2013.01)

(58) Field of Classification Search
None
See application file for complete search history.

(56) References Cited

U.S. PATENT DOCUMENTS

2005/0231760 A1* 10/2005 Minato .............. H04N 1/00416
358/1.15
2008/0271060 A1    10/2008 Akiyoshi
(Continued)

FOREIGN PATENT DOCUMENTS

EP    3229453 A1    10/2017
JP    2011-248536 A    12/2011
(Continued)

*Primary Examiner* — Henok Shiferaw
(74) *Attorney, Agent, or Firm* — Jefferson IP Law, LLP

(57) ABSTRACT

An image forming device and method for supporting multiple platforms are provided. The image forming device includes a communication device, a processor, a memory, and a user interface device. The processor may request an app server for a list of apps usable by the image forming device, and receive the list from the app server. The processor may determine a first app to be controlled in the list. The processor may obtain information of the second app that provides a same or similar service as a service provided by the first app based on information of the first app, and is supported by a second platform different from a first platform supporting the first app. The processor may perform an operation to control a state of the second app on the second platform based on an operation to control a state of the first app on the first platform.

20 Claims, 13 Drawing Sheets

(56) References Cited

U.S. PATENT DOCUMENTS

| | | | |
|---|---|---|---|
| 2010/0037104 A1* | 2/2010 | Jung | G03G 15/5079 |
| | | | 714/49 |
| 2010/0094925 A1* | 4/2010 | St Jacques, Jr. | H04N 21/4788 |
| | | | 709/202 |
| 2010/0134832 A1* | 6/2010 | Numata | G06K 15/02 |
| | | | 358/1.15 |
| 2013/0139075 A1 | 5/2013 | Park | |
| 2013/0148150 A1 | 6/2013 | Ananthesh | |
| 2014/0123240 A1* | 5/2014 | Seo | H04L 63/104 |
| | | | 726/4 |
| 2014/0215499 A1* | 7/2014 | Kawai | G06F 9/44536 |
| | | | 719/328 |
| 2016/0034263 A1 | 2/2016 | Homma | |
| 2016/0044201 A1* | 2/2016 | Fujisawa | H04N 1/00954 |
| | | | 358/1.9 |

FOREIGN PATENT DOCUMENTS

| | | |
|---|---|---|
| JP | 5156083 B2 | 3/2013 |
| JP | 5293238 B2 | 9/2013 |
| JP | 2016-95602 A | 5/2016 |
| KR | 10-2013-0061009 A | 6/2013 |

* cited by examiner

[Fig. 1]
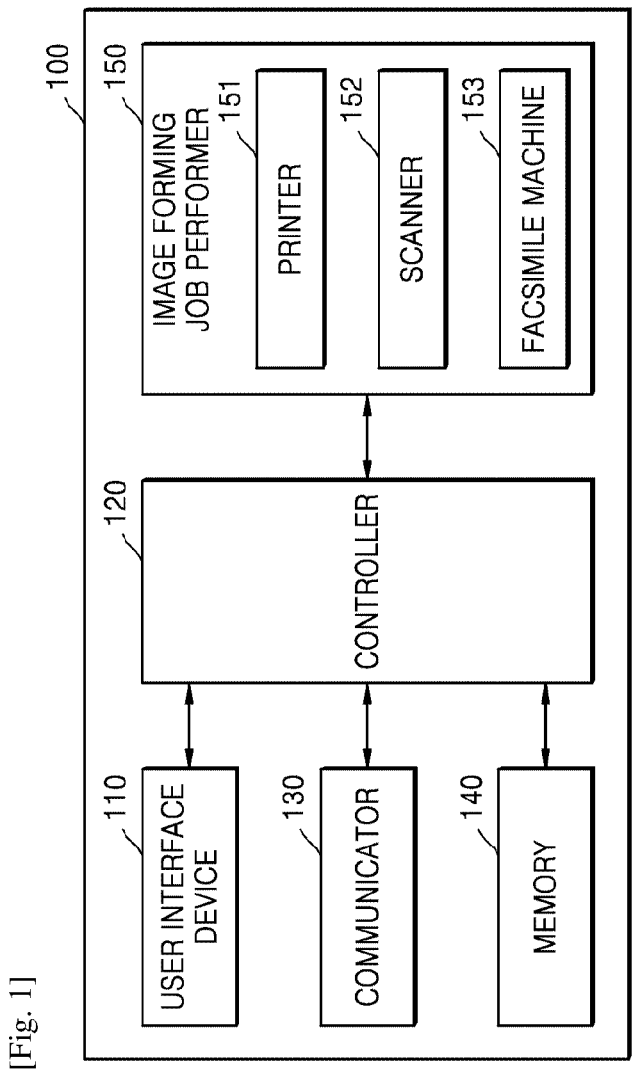

[Fig. 2]
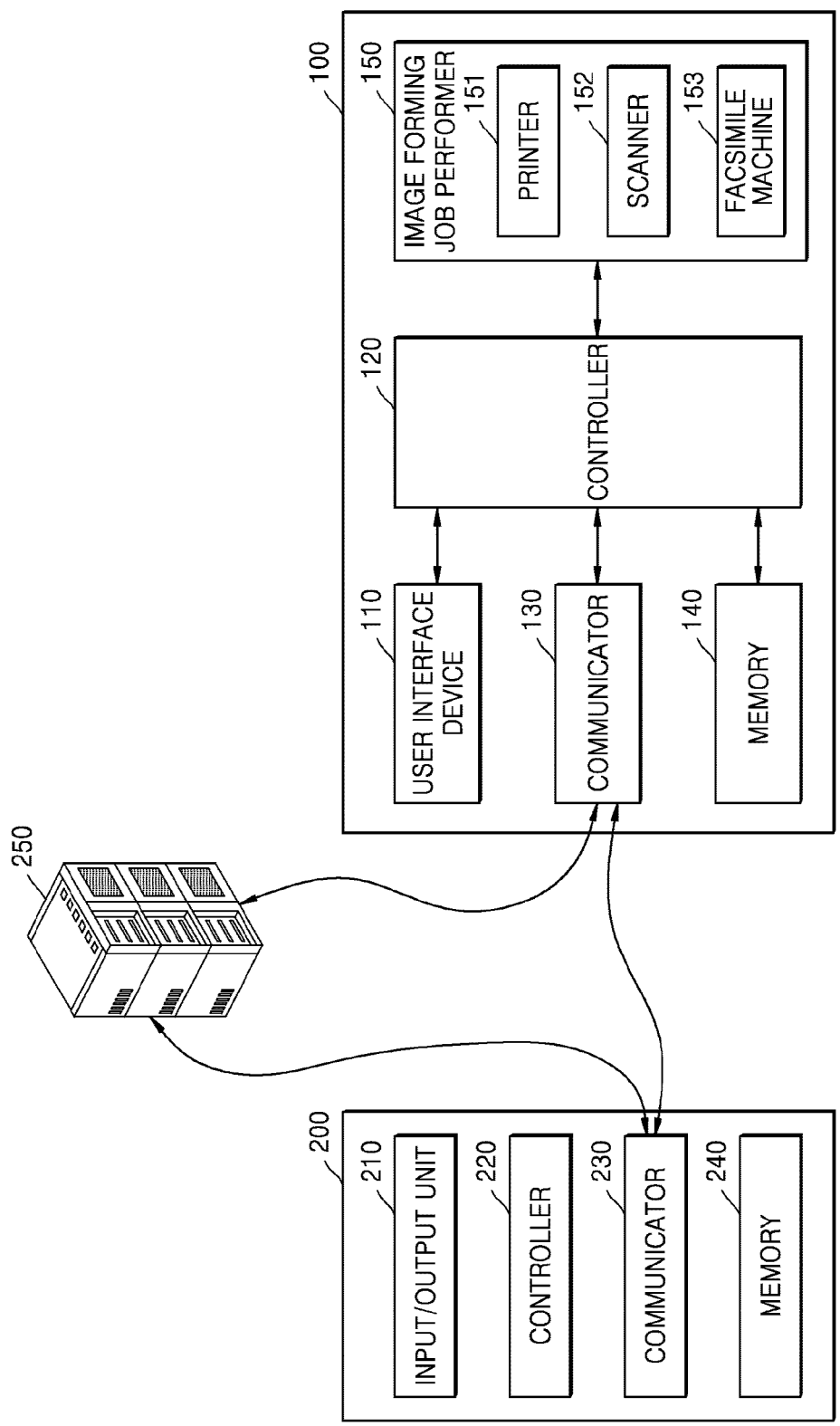

[Fig. 3A]
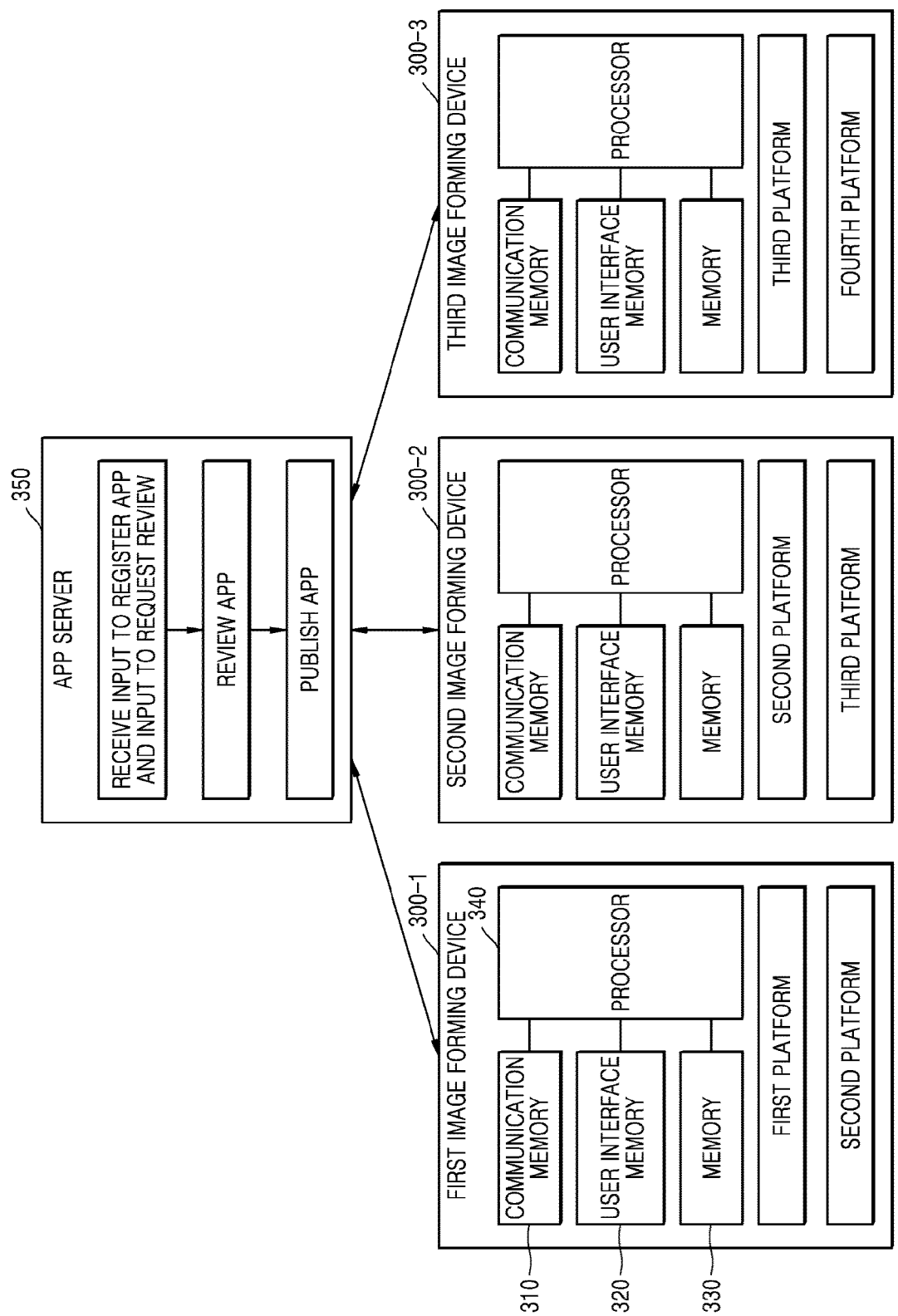

[Fig. 3B]
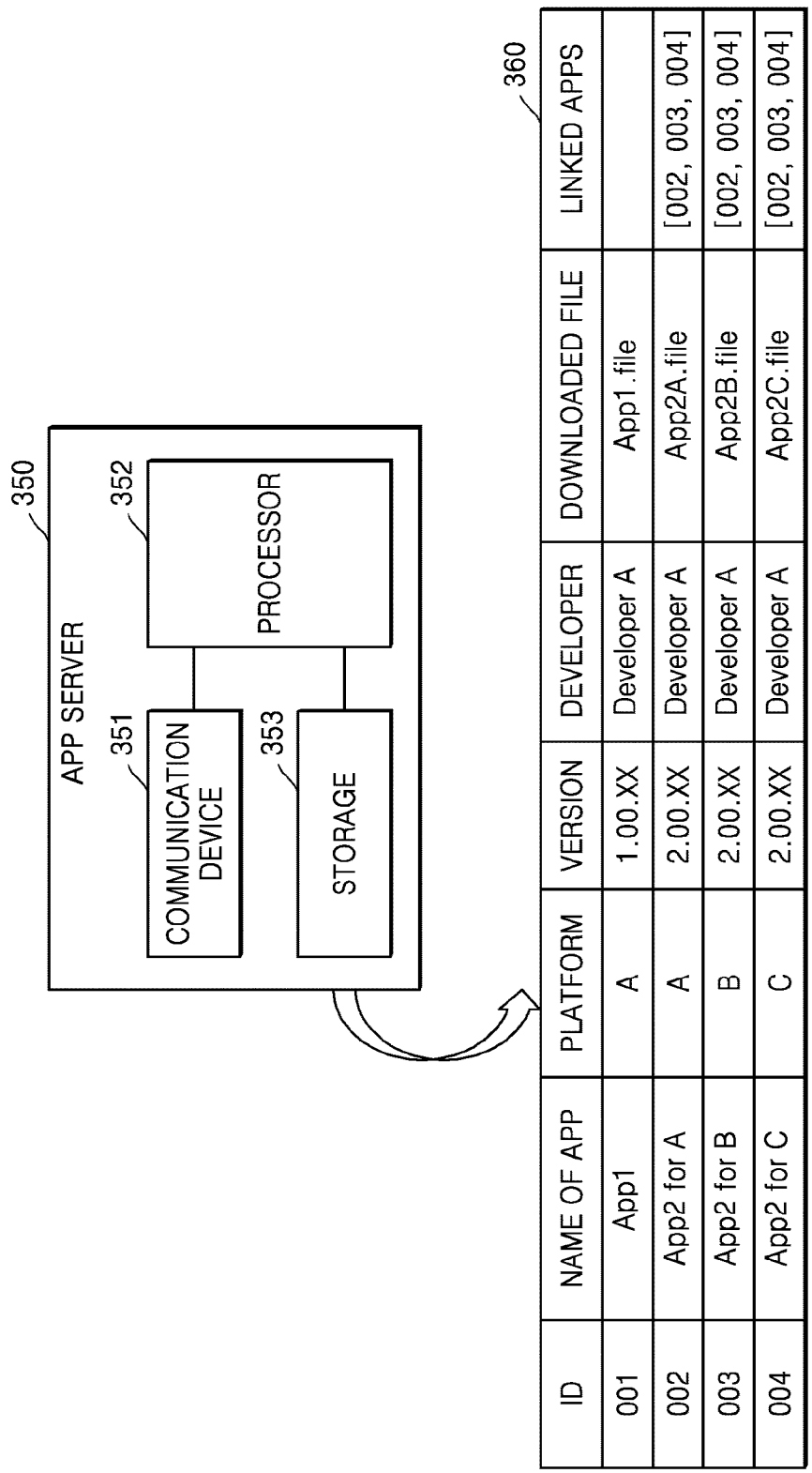

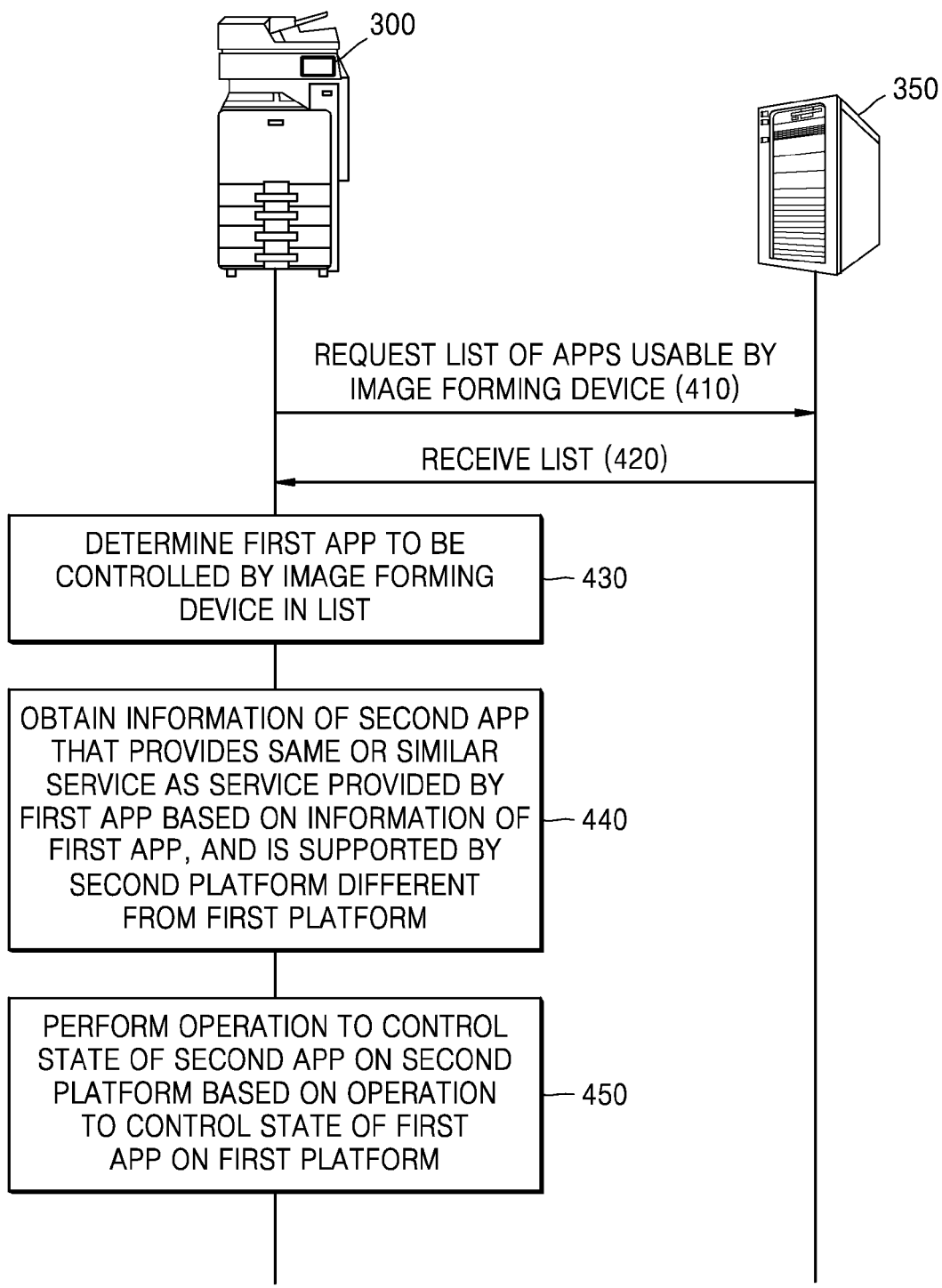

[Fig. 5]
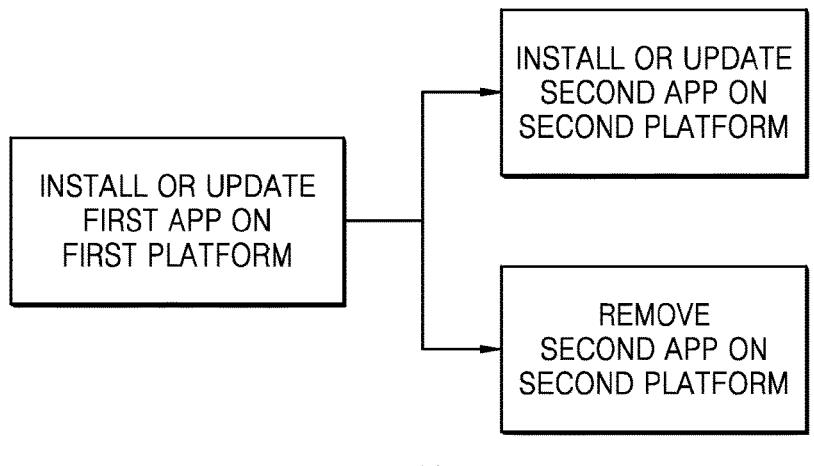
510
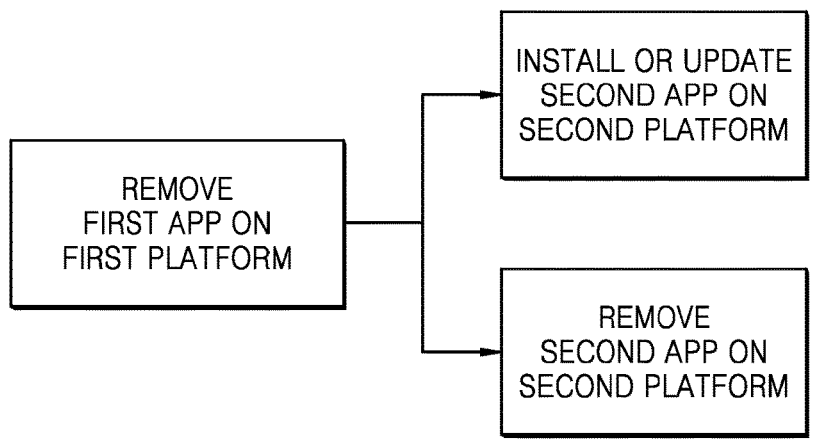
520
[Fig. 6]
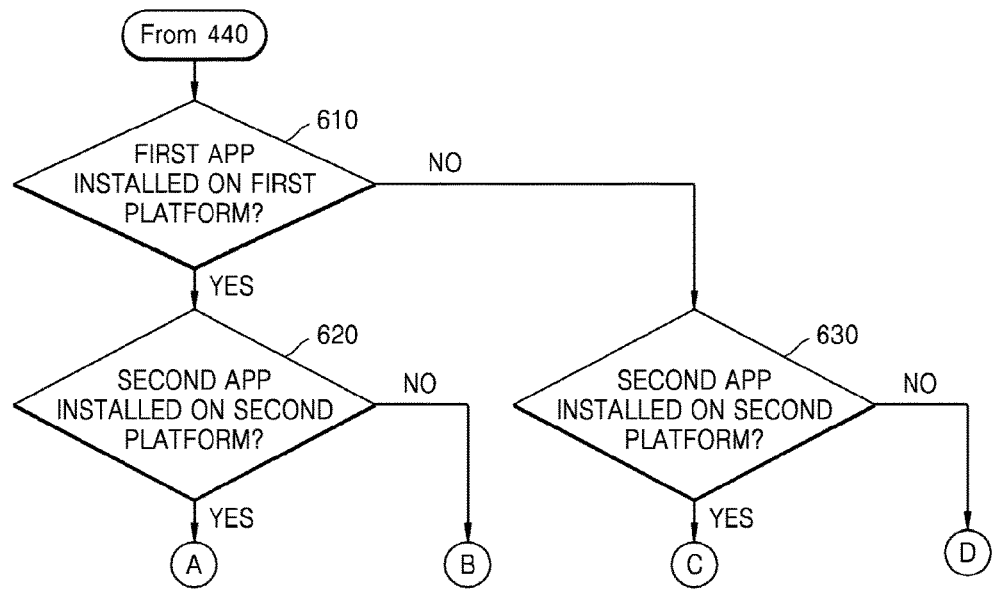

[Fig. 7]
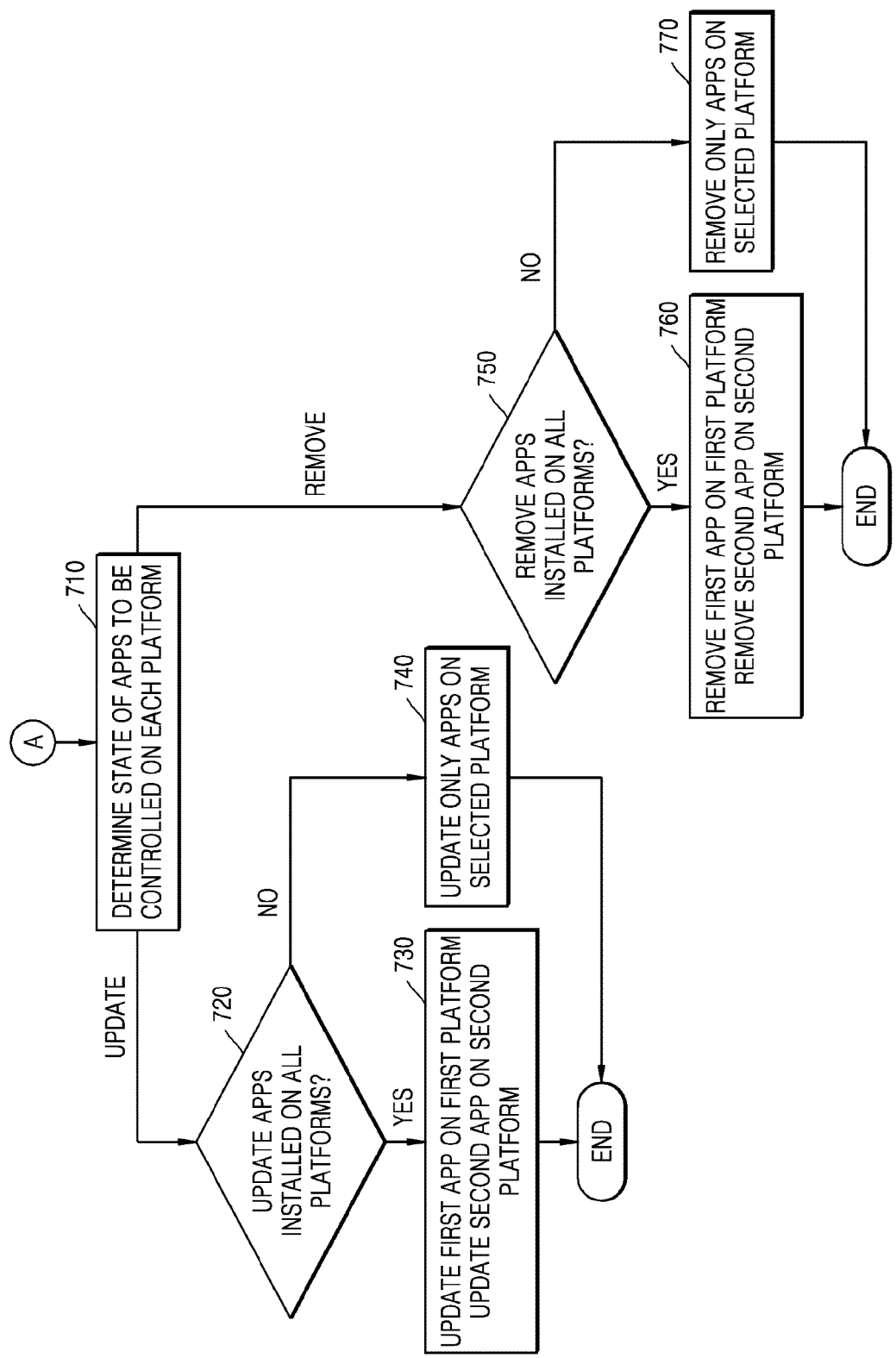

[Fig. 8]
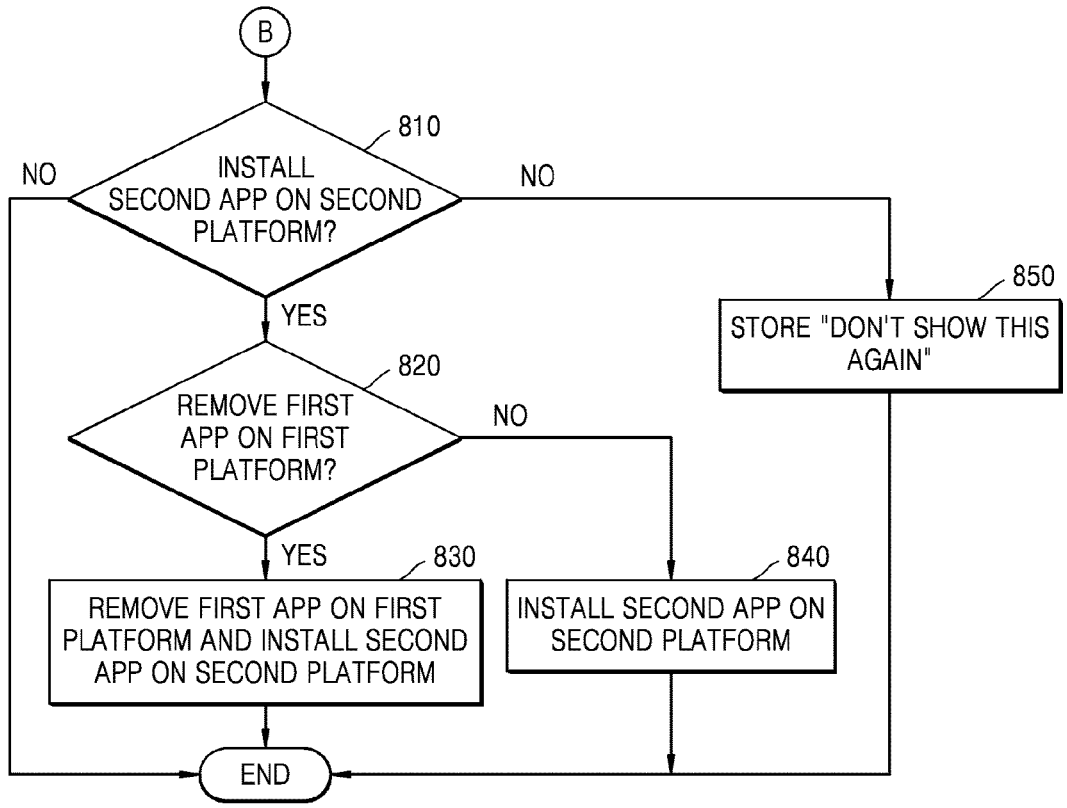
[Fig. 9]
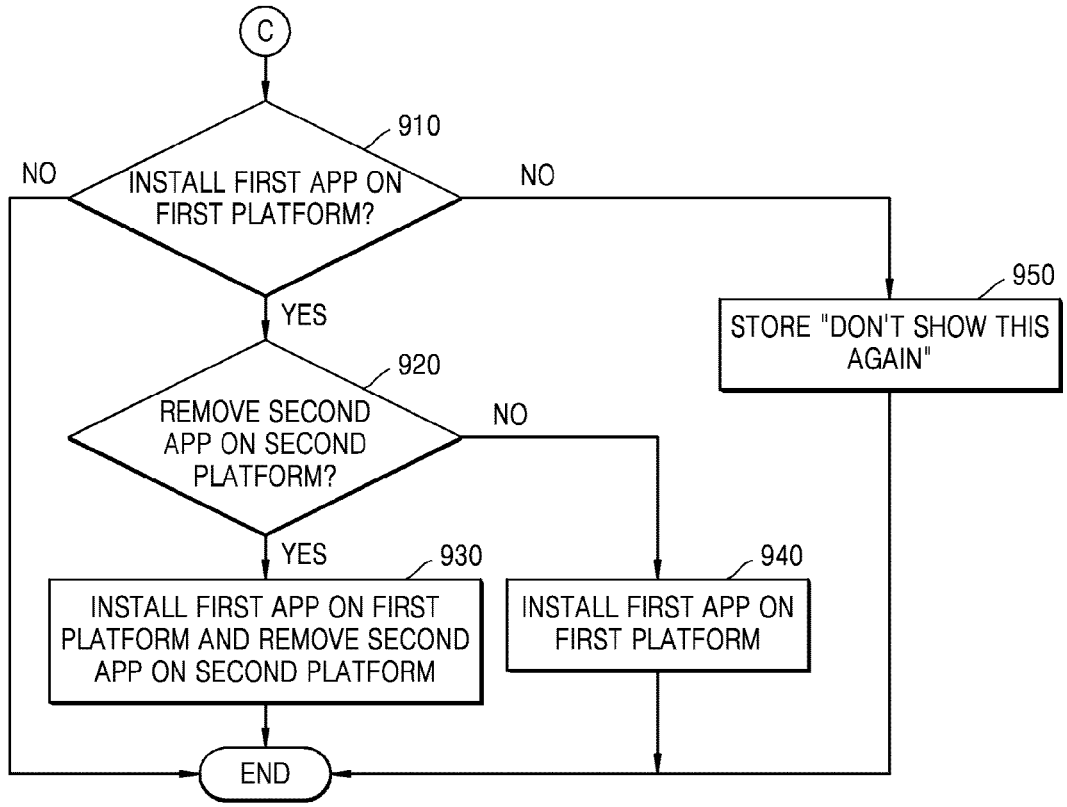

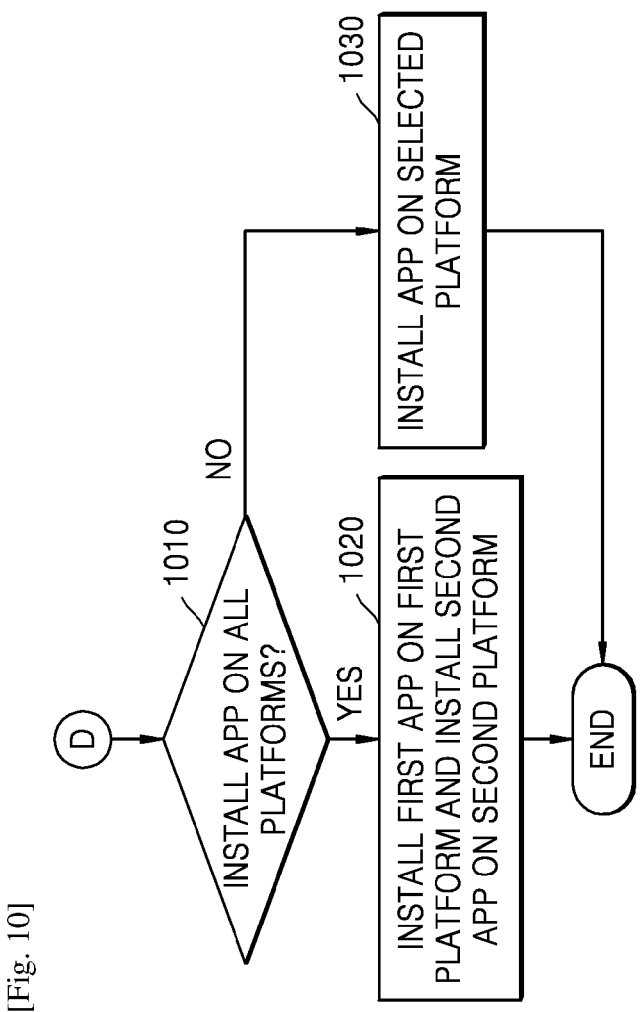
[Fig. 10]

[Fig. 11]
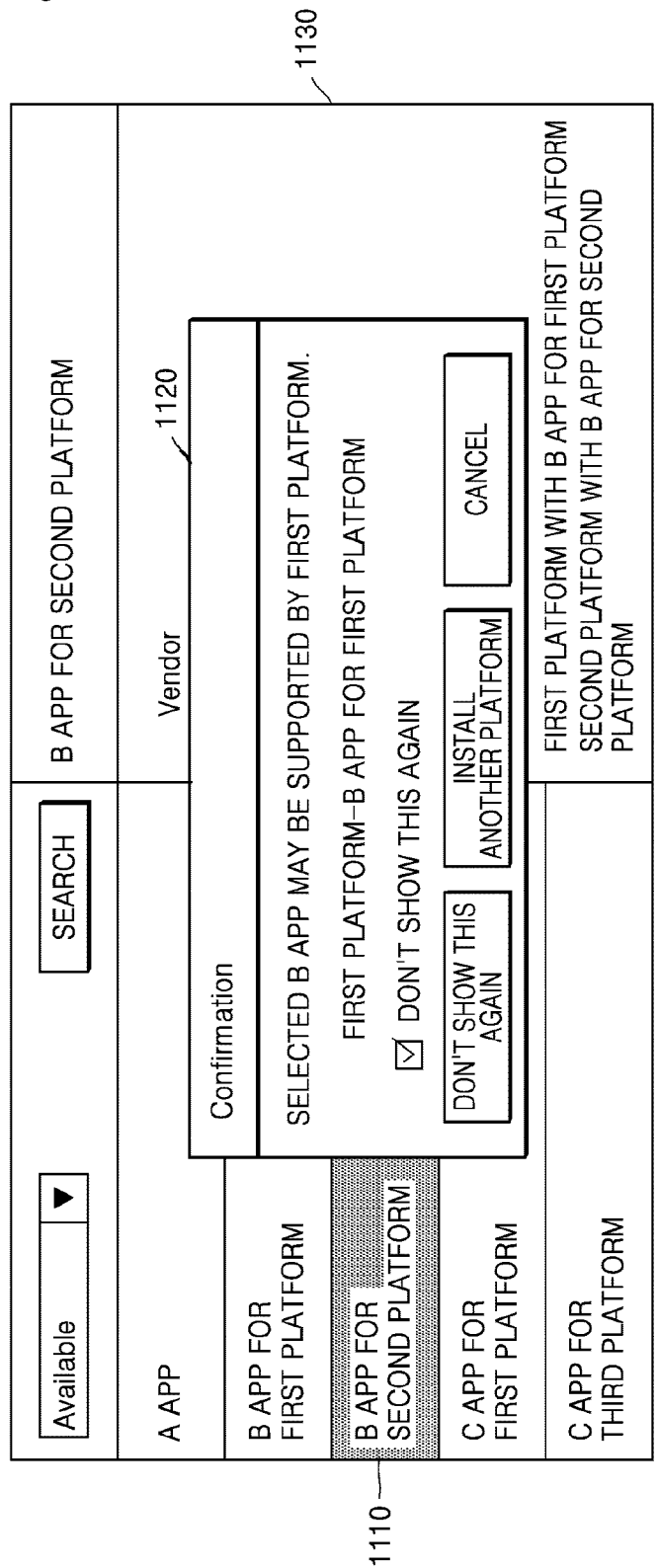

[Fig. 12]

| Available ▶ | | B APP FOR SECOND PLATFORM |
|---|---|---|
| | SEARCH | Vendor |
| A APP | | |
| B APP FOR FIRST PLATFORM | | |
| B APP FOR SECOND PLATFORM | | |
| C APP FOR FIRST PLATFORM | | |
| C APP FOR THIRD PLATFORM | | |

Confirmation

SELECTED APPS MAY BE UPDATED.

☑ FIRST PLATFORM–B APP FOR FIRST PLATFORM
  *CURRENT PLATFORM*
☑ SECOND PLATFORM–B APP FOR SECOND PLATFORM

| UPDATE ALL | UPDATE | CANCEL |

FIRST PLATFORM WITH B APP FOR FIRST PLATFORM
SECOND PLATFORM WITH B APP FOR SECOND PLATFORM 1210, 1220, 1230

[Fig. 13]
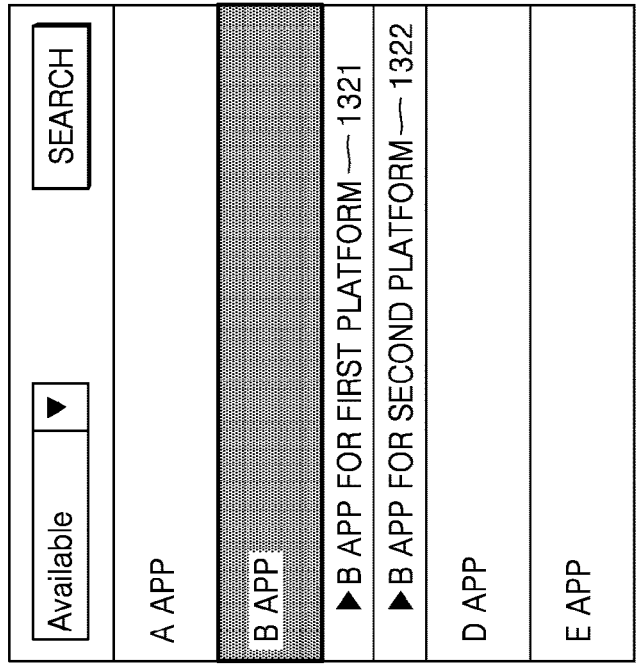
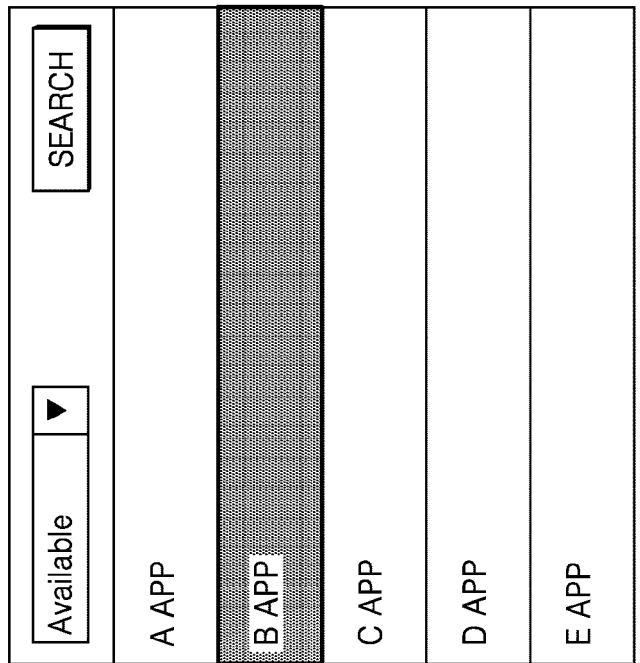

[Fig. 14]
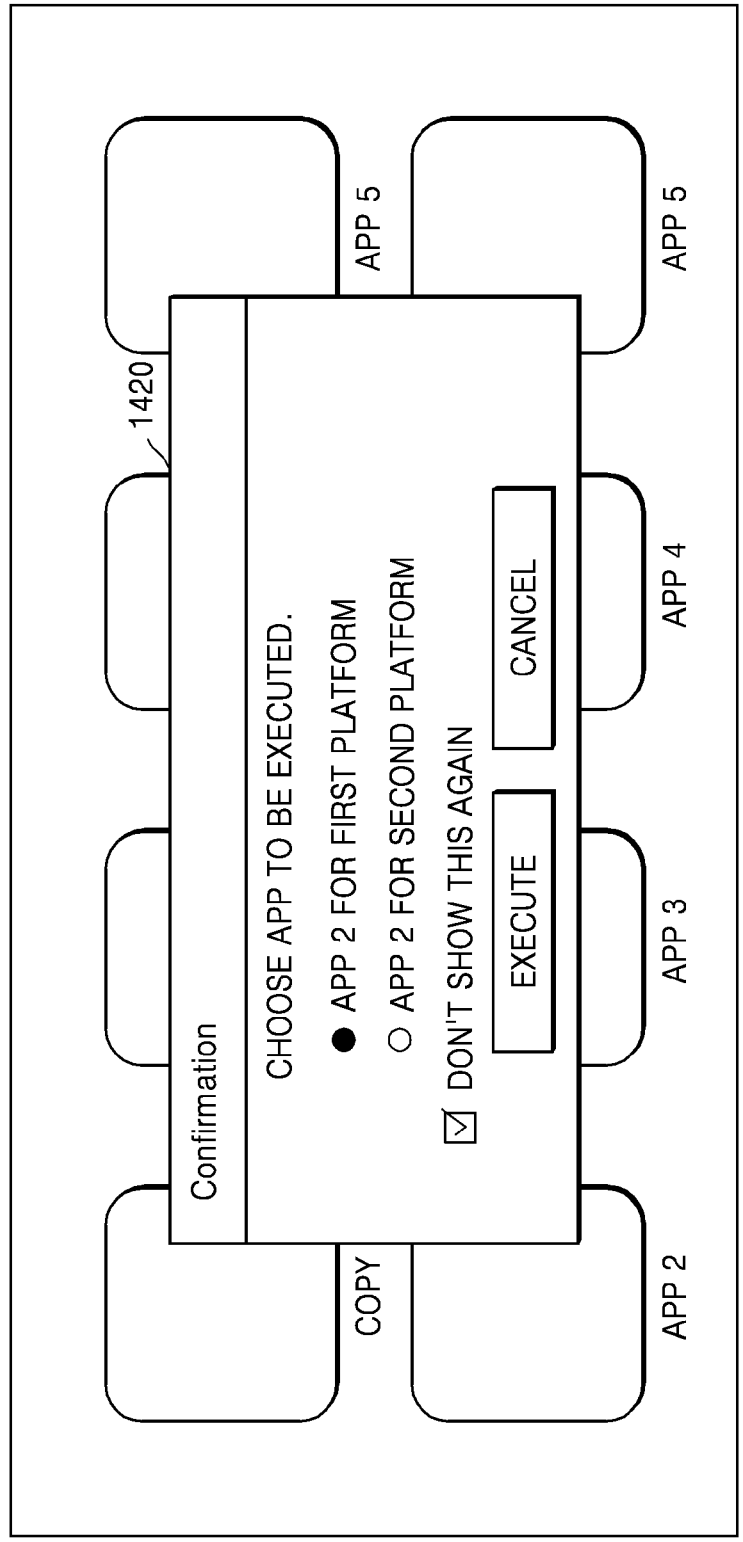

CONTROL OF APPS PROVIDING SAME OR SIMILAR SERVICES IN IMAGE FORMING DEVICE SUPPORTING MULTIPLE PLATFORMS

BACKGROUND ART

An image forming device may be connected to a server that distributes applications (apps), and may download an app necessary for the image forming device and install the app.

The image forming device that performs an image forming job based on multiple platforms may download an app required for each of the multiple platforms from the server and install the app on each of the multiple platforms. When an identical app is installed in the image forming device supporting the multiple platforms, the image forming device may separately install the app on each of the multiple platforms.

BRIEF DESCRIPTION OF DRAWINGS

The above and other aspects, features, and advantages of certain examples of the present disclosure will be more apparent from the following description taken in conjunction with the accompanying drawings, in which:

FIG. 1 is a view of a configuration of an image forming device according to an example;

FIG. 2 is a view of an image forming device connected to a user terminal or a server, according to an example;

FIG. 3A is a conceptual diagram for explaining an operation between an image forming device supporting multiple platforms and an application (app) server, according to an example;

FIG. 3B is a view of a configuration of an app server and a list of apps stored in a storage, according to an example;

FIG. 4 is a view for explaining a process of controlling an app supported by each platform, by an image forming device supporting multiple platforms, according to an example;

FIG. 5 is a view for explaining a process of controlling a state of a second app supported by a second platform by controlling a state of a first app supported by a first platform in an image forming device, according to an example;

FIG. 6 is a view for explaining a process in which an image forming device controls a state of an app supported by each platform according to whether a first app supported by a first platform is installed and a second app supported by a second platform is installed, according to an example;

FIG. 7 is a view for explaining a process in which an image forming device controls a state of an app supported by each platform when a first app supported by a first platform and a second app supported by a second platform are installed on the respective platforms, according to an example;

FIG. 8 is a view for explaining a process in which an image forming device controls a state of an app supported by each platform when a first app supported by a first platform is installed in the first platform and a second app supported by a second platform is not installed in the second platform, according to an example;

FIG. 9 is a view for explaining a process in which an image forming device controls a state of an app supported by each platform when a first app supported by a first platform is not installed in the first platform and a second app supported by a second platform is installed in the second platform, according to an example;

FIG. 10 is a view for explaining a process in which an image forming device controls a state of an app supported by each platform when a first app supported by a first platform and a second app supported by a second platform are not installed on the respective platforms, according to an example;

FIG. 11 is a view for explaining an execution screen displayed on an image forming device when an input for selecting an app supported by a second platform is received in the image forming device, according to an example;

FIG. 12 is a view for explaining an execution screen displayed on an image forming device when an input for selecting an app supported by a second platform is received in the image forming device, according to another example;

FIG. 13 is a view for explaining an execution screen for displaying information of apps supported by each of multiple platforms when an input for selecting a certain app in a list output from an image forming device is received, according to an example; and FIG. 14 is a view for explaining an execution screen that is set for displaying one representative app from among certain apps providing an identical service in an image forming device, according to an example.

Throughout the drawings, it should be noted that like reference numbers are used to depict the same or similar elements, features, parts, components, and structures.

MODE FOR THE INVENTION

An "image forming device" may be any device capable of performing an image forming job, such as a printer, a scanner, a copier, a fax machine, a multi-function printer (MFP), or a display device. Also, "print data" may be data converted into a printable format in a printer and a "scan file" may be a file generated by scanning an image with a scanner.

Below, a description will be given about examples of the present disclosure with reference to attached drawings such that one with an ordinary skill in the art may easily perform examples. In this regard, the present disclosure may have different forms and should not be construed as being limited to the descriptions set forth herein.

FIG. 1 is a view of a configuration of an image forming device according to an example.

Referring to FIG. 1, an image forming device 100 may include a user interface device 110, a controller 120, a communicator 130, a memory 140, and an image forming job performer 150. Also, although not shown in FIG. 1, the image forming device 100 may further include a power source for supplying power to each component.

The user interface device 110 may include an input unit for receiving, from a user, an input for performing an image forming job, and an output unit for displaying information, such as a result of performing the image forming job or a state of the image forming device 100. For example, the user interface device 110 may include an operation panel for receiving a user input and a display panel for displaying a screen.

In more detail, the input unit may include at least one device for receiving various types of user inputs, such as a keyboard, a physical button, a touch screen, a camera, a microphone, or the like. Also, the output unit may include, for example, a display panel, a speaker, or the like. However, an example is not limited thereto, and the user interface device 110 may include a device supporting various inputs and outputs.

The controller 120 controls overall operations of the image forming device 100, and may include at least one processor, such as a central processing unit (CPU). The controller 120 may control other components included in the image forming device 100 such that an operation corresponding to a user input received through the user interface device 110 is performed. The controller 120 may include at least one specialized processor corresponding to each function, or may be a single integrated processor.

For example, the controller 120 may execute a program stored in the memory 140, read data or a file stored in the memory 140, or store a new file in the memory 140.

The communicator 130 may communicate with another device or a network in a wired or wireless manner. Accordingly, the communicator 130 may include a communication module, such as a transceiver, supporting at least one of various wired and wireless communication methods. For example, the communication module may be in a form of a chipset or may be a sticker or a bar code (e.g., a sticker including a near field communication (NFC) tag) including information required for communication.

The communicator 130 may support, for example, at least one of wireless fidelity (Wi-Fi), Wi-Fi direct, Bluetooth, ultra-wideband (UWB), NFC, or the like. The communicator 130 may also support, for example, at least one of a universal serial bus (USB), a high definition multimedia interface (HDMI), or the like.

The communicator 130 may be connected to an external device outside the image forming device 100 to transmit and receive a signal or data to and from the external device. For example, the image forming device 100 may be connected to a user terminal through the communicator 130. The communicator 130 may transmit a signal or data received from the user terminal to the controller 120, or transmit a signal or data generated by the controller 120 to the user terminal. For example, when the communicator 130 receives a print command signal or print data from the user terminal, the controller 120 may print the received print data through a printer 151.

The image forming device 100 of FIG. 1 may support multiple platforms. As the image forming device 100 controls a state of a first application (app) on a first platform among the multiple platforms, a state of an app providing the same or similar service as a service provided from a first app on a platform different from the first platform may be controlled.

FIG. 2 is a view of an image forming device connected to a user terminal or a server, according to an example.

Referring to FIG. 2, a user terminal 200 may include an input/output unit 210, a controller 220, a communicator 230, and a memory 240. The controller 220 may control an image forming job by executing a program stored in the memory 240 and transmitting a signal or data generated as a result of executing the program to the image forming device 100 through the communicator 230. The user terminal 200 may be, for example, a smart phone, a personal computer (PC), a tablet PC, a medical device, a camera, a wearable device, or the like.

The communicator 130 may be directly connected to a server 250 to transmit and receive signals or data. Also, the communicator 130 may be connected to the user terminal 200 through the server 250. That is, the communicator 130 of the image forming device 100 may transmit and receive signals or data to and from the communicator 230 of the user terminal 200 through the server 250.

Referring again to FIG. 1, various kinds of data such as programs and files such as an app may be installed and stored in the memory 140. The controller 120 may access the data stored in the memory 140 to use the data, or may store new data in the memory 140. Also, the controller 120 may execute the program installed in the memory 140 and may install an app received from an external source through the communicator 130 in the memory 140.

The image forming job performer 150 may perform an image forming job, such as printing, scanning, copying, or faxing.

Referring to FIG. 1, the image forming job performer 150 may include the printer 151, a scanner 152, and a facsimile machine 153, but the image forming job performer 150 may include some of them or may further include a component for performing another type of image forming job.

The printer 151 may form an image on a recording medium through any one of various printing methods, such as an electrophotography method, an inkjet method, a thermal transfer method, a thermal method, or the like.

The scanner 152 may irradiate light onto paper and receive light reflected from the paper on an image sensor to read an image recorded on the paper. Examples of an image sensor for reading an image from paper include a charge-coupled device (CCD) and a contact type image sensor (CIS). The scanner 152 may have a flatbed structure in which paper is located at a fixed location and an image sensor moves to read an image, a document feed structure in which an image sensor is located at a fixed location and paper is transferred, or a combination structure thereof.

The facsimile machine 153 may share a component for scanning an image with the scanner 152, share a component for printing a received file with the printer 151, transmit a scan file to a destination, or receive a file from the outside.

Terms of elements of the above-described image forming device 100 may vary. Furthermore, the image forming device 100 may include at least one of the above-described elements, and may omit some elements or further include other elements.

The user interface device 110 of FIG. 1 may be provided with a unique control system. For example, the user interface device 110 may include a control system (e.g., a controller, a memory, etc.) for controlling a user interface (UI) provided by the user interface device 110, separately from the controller 120 of the image forming device 100. Programs such as an operating system (OS) for providing the UI and an app for supporting various functions may be installed in the control system of the user interface device 110. As another example, the programs and apps may be installed in the memory 140 and accessed by the user interface device 110.

The image forming device 100 of FIG. 2 may request a list of apps usable by the image forming device 100 from the server 250 through the communicator 130 and may receive information, data, files, or the like related to an app to be controlled by the image forming device 100 from the server 250. Also, the image forming device 100 of FIG. 2 may receive a command or input from the user interface device 110 or the user terminal 200 to control an app to be controlled in the image forming device 100.

FIG. 3A is a conceptual diagram for explaining an operation between an image forming device supporting multiple platforms and an app server, according to an example.

Referring to FIG. 3A, an app server 350 may transmit a file of apps to be installed in image forming devices 300-1, 300-2, and 300-3 supporting multiple platforms to the image forming devices 300-1, 300-2, and 300-3, may transmit a file used for updating the installed apps to the image forming devices 300-1, 300-2, and 300-33, may transmit a file used for removing the installed apps to the image forming devices 300-1, 300-2, and 300-3, or the like.

A "platform" may mean a hardware structure or a software framework in which software that is a basis of the image forming devices 300-1, 300-2, and 300-3 may be driven. The "platform" may include an architecture, an operating system, a programming language, a runtime library, a graphical user interface (GUI), or the like. Further, the "image forming devices 300-1, 300-2, and 300-3" may perform an image forming job based on multiple platforms.

As shown in FIG. 3A, the first image forming device 300-1 may perform operations for installing, executing, updating, and removing apps supported by a first platform or a second platform. The second image forming device 300-2 may perform operations for installing, executing, updating, and removing apps supported by the second platform or a third platform. The third image forming device 300-3 may perform operations for installing, executing, updating, and removing apps supported by the third platform or a fourth platform.

The app server 350 may manage apps usable by the image forming devices 300-1, 300-2, and 300-3 supporting the multiple platforms. The app server 350 may group apps providing an identical service or similar services and store them in a storage. Here, the grouping may be performed based on information about a name of an app, a platform supporting the app, a version of the app, a developer of the app, a downloaded file of the app, the most relevant apps stored in the storage, or the like. In addition, if apps providing an identical service or similar services have respective platforms to support the apps, the app server 350 may separate the apps by platform and store them in the storage. Also, the app server 350 may group the apps providing an identical service or similar services and store them in the storage based on an input of a developer who developed each of the apps.

For example, the app server 350 may divide "app 1" and "app 2" providing a scan service into an identical group and store them in the storage. In addition, the app server 350 may divide "app 1 supported by the first platform" and "app 1 supported by the second platform" and store each of them in the storage.

The app server 350 may receive an input to register an app from a developer who has developed the app and an input to request a review of the registered app. The app server 350 may perform an app review and may determine whether the app requested to be reviewed conforms to a pre-set criterion. As a result of the app review, if the app requested to be reviewed conforms to the pre-set criterion, the app server 350 may publish the app so that the registered app may be distributed. On the other hand, if the app requested to be reviewed does not conform to the pre-set criterion, the app server 350 may reject the registered app. An example operation related to the app server 350 is described in FIG. 3B.

Hereinafter, the first image forming device 300-1, the second image forming device 300-2, and the third image forming device 300-3 will be referred to as "an image forming device 300" for convenience.

The image forming device 300 shown in FIG. 3A may include a communication device 310, a user interface device 320, a memory 330, and a processor 340. However, not all elements shown in the drawings are necessary elements. The image forming device 300 may be embodied with more or fewer elements than the elements shown in the drawings. Hereinafter, the elements will be described.

The communication device 310 may correspond to the communication unit 130 shown in FIG. 1, the user interface device 320 may correspond to the user interface device 110 shown in FIG. 1, the memory 330 may correspond to the memory 140 shown in FIG. 1, and the processor 340 may correspond to the controller 120 shown in FIG. 1. In FIG. 3A, the same reference numerals as in FIG. 1 denote the same elements, and therefore, detailed descriptions thereof will not be given herein.

The communication device 310 may communicate with an external device. For example, the image forming device 300 may communicate with the app server 350 through the communication device 310 to request a "scan to email app" that provides a service for transmitting e-mails after scanning. The communication device 310 may receive a file of the "scan to email app" from the app server 350. Of course, the "scan to email app" is only an example and the image forming device 300 may communicate with the app server 350 through the communication device 310 to request any of various other apps.

The user interface device 320 may receive a user input and display information related to the image forming device 300. For example, the user interface device 320 may display a screen requiring a user input according to an operation of the processor 340, a screen displaying a result of an operation of the processor 340, a screen displaying a state of the image forming device 300, a screen displaying information of apps installed in the image forming device 300, or the like. For example, the user interface device 320 may display a list including information of apps supported by multiple platforms received from the app server 350. In addition, the user interface device 320 may display a screen for installing, executing, updating, or removing a selected app in the list.

The memory 330 may store programs, data, or files associated with the image forming device 300. For example, the processor 340 may execute a program stored in the memory 330, read data or a file stored in the memory 330, or store a new file in the memory 330. The memory 330 may store program commands, data files, data structures or a combination thereof. The memory 330 may store instructions executable by the processor 340.

For example, the memory 330 may store instructions for requesting the app server 350 for a list of apps usable by the image forming device 300, and receiving a list from the app server 350, may store instructions for determining the first app to be controlled by the image forming device 300 in the list, may store instructions for obtaining information of a second app that provides a same or similar service as a service provided by the first app based on the information of the first app, and is supported by a second platform different from a first platform supporting the first app, may store instructions for performing operations to control the state of the second app on the second platform, based on the operation to control the state of the first app on the first platform, or the like.

The processor 340 may request the app server 350 for a list of apps usable by the image forming device 300 through the communication device 310. In addition, the processor 340 may transmit, to the app server 350, information of multiple platforms supported by the image forming device 300. The processor 340 may receive the list from the app server 350 through the communication device 310. Here, the list may include information of apps supported by the multiple platforms of the image forming device 300.

The processor 340 may determine the first app to be controlled by the image forming device 300 in the list. In more detail, the processor 340 may display the list including the information of apps supported by the multiple platforms through the user interface device 320. In addition, the processor 340 may receive an input to select the first app to be controlled in the image forming device 300 through the user interface device 320.

The processor 340 may obtain information of the second app that provides a same or similar service as a service provided by the first app based on the information of the first app and is supported by the second platform different from the first platform supporting the first app. Here, the same service as the service provided by the first app may mean providing the same function as a function provided by the first app. In addition, a service similar to the service provided by the first app may mean providing a function similar to that provided by the first app, or providing another function while providing the same function.

For example, if the first app is an app providing a scan function in the first platform, the processor 340 may obtain information of the second app supported by a platform different from the first platform from among an app providing a scan function, an app providing a function of transmitting a scan file after scanning via an e-mail, a function of transmitting a scan file after scanning via a facsimile machine, or the like. In this case, the processor 340 may obtain the information of the second app based on the list received from the app server 350.

The processor 340 may request the information of the first app from the app server 350 through the communication device 310 and receive the information of the first app from the app server 350. Here, the information of the first app may include information of the service provided by the first app, information of the first platform supporting the first app, information about the state of the first app on the first platform, information about a degree of relevance between similar apps providing the same or similar service as the service provided by the first app and the first app, or the like. The information about the state of the first app on the first platform may include information indicating whether or not the first app is installed on the first platform, information about a version of the first app installed on the first platform, Information indicating whether updating of the first app is necessary, or the like. In an example, the degree of relevance of the similar app to the first app may be set to be as high as that of a similar app providing the same service as the service provided by the first app or providing a service similar to the service provided by the first app.

Based on the information of the first app, the processor 340 may determine whether there are similar apps that provide a service that is the same or similar to that provided by the first app in the list, and are supported by a platform different from the first platform.

As a result of the determination, if there are similar apps providing services that are the same as or similar to the service provided by the first app, the processor 340 may group the apps in the list based on the degree of relevance between the similar apps and the first app and display a result of the grouping through the user interface device 320.

In more detail, the processor 340 may display information of the similar apps through the user interface device 320 in an order of a degree of relevance to the service provided by the first app among the services provided by the respective similar apps. The processor 340 may display information of a platform supported by each of the similar apps and state information including whether each of the similar apps is installed on the platform through the user interface device 320.

The processor 340 may perform an operation to control a state of the second app on the second platform based on the operation to control a state of the first app on the first platform. In more detail, the user interface device 320 may receive an input to control the state of the first app on the first platform. The processor 340 may perform an operation that is supported by the second platform and control the state of the second app providing a service that is the same or similar to that provided by the first app while performing the operation of controlling the state of the first app based on the input to control the state of the first app. Here, the processor 340 may perform an operation of controlling the state of the second app on the second platform in consideration of a space of the current memory 330 of the image forming device 300, current image processing capability, or the like. Furthermore, the processor 340 may perform an operation to control the state of the second app on the second platform based on an input to control the state of the second app on the second platform.

For example, the processor 340 may control the second app to be in a second state corresponding to a first state on the second platform while controlling the first app to be in the first state to be controlled on the first platform, or may control the second app to a third state opposite to the first state on the second platform, while controlling the first app to be in the first state to be controlled on the first platform. In an example, the processor 340 may remove the second app installed on the second platform that provides the same or similar service as the service provided by the first app while installing the first app on the first platform. In addition, the processor 340 may also update the second app installed on the second platform that provides the same or similar service as the service provided by the first app while installing the first app on the first platform.

In another example, if the processor 340 cannot control the first app to be in the first state to be controlled on the first platform, the processor 340 may control the second app to be in the second state corresponding to the first state on the second platform. In more detail, if the first app is installed on the first platform and then stopped, or if the first app cannot be installed, the processor 340 may install the second app providing the same or similar service as the service provided by the first app on the second platform.

In another example, the processor 340 may perform installing or updating of the second app on the second platform when the first app on the first platform is installed or updated, removing the second app from the second platform when the first app is installed or updated on the first platform, installing or updating the second app on the second platform when the first app is removed from the first platform, removing the second app from the second platform when the first app is removed from the first platform, or the like.

That is, the processor 340, by controlling the state of a certain app on a certain platform, may efficiently manage apps providing an identical service or similar services on multiple platforms by controlling states of other apps providing services that are the same or similar to a service provided by the certain app on another platform.

The processor 340 may collectively control operations of the communication device 310, the user interface device 320, and the memory 330. The processor 340 may be implemented as an array of logic gates, and may be implemented as a combination of a universal microprocessor and a memory in which a program executable in the microprocessor is stored. Also, it will be understood by one of ordinary skill in the art that the processor 340 may be formed using different forms of hardware.

Hereinafter, even if configurations of the image forming device 300 are not specified, the image forming device 300 should be construed to encompass all examples that would normally occur to one of ordinary skill in the art. Also, the scope of rights of the present disclosure is not limited to particular configurations or physical/logical structures.

FIG. 3B is a view of a configuration of an app server and a list of apps stored in a storage, according to an example.

Referring to FIG. 3B, the app server 350 may include a communication device 351, a processor 352, and a storage 353. However, not all elements shown in the drawings are necessary elements. The app server 350 may be embodied with more or fewer elements than the elements shown in FIG. 3B. Hereinafter, the elements will be described.

The app server 350 may correspond to the server 250 of FIG. 2. In FIG. 3B, the same reference numerals as in FIG. 2 denote the same elements, and therefore, detailed descriptions thereof will not be given herein.

The communication device 351 may communicate with the image forming device 300. For example, the communication device 351 may receive a request for a list of apps usable by the image forming device 300 from the image forming device 300. The communication device 351 may receive information of a platform supported by the image forming device 300 from the image forming device 300 and may transmit the list of apps usable by the image forming device 300 obtained based on the received information of the platform. The communication device 351 may transmit a file of a certain app stored in the storage 353 in response to a request for a file transfer of the certain app from the image forming device 300.

The processor 352 may manage apps usable by the image forming device 300 supporting multiple platforms. The processor 352 may group apps providing an identical service or similar services and store them in the storage 353. Here, if apps providing an identical service or similar service have respective platforms to support the apps, the processor 352 may separate the apps by platform and store them in the storage 353.

As shown in FIG. 3B, the processor 352 may also store information about a name of each of the apps, a platform supporting the app, a version of the app, a developer of the app, a downloaded file of the app, the most relevant apps stored in the storage 353, or the like while storing a list 360 of the plurality of apps in the storage 353. For example, the processor 352 may store an app 2 as app 2 for A, app 2 for B, and app 2 for C separately for each of A platform, B platform, and C platform, and may store the app 2 as apps linked to each other.

In addition, the processor 352 may receive an input to register an app from a developer who has developed the app and an input to request a review of the registered app through the communication device 351. The processor 352 may determine whether the app requested to be reviewed conforms to a pre-set criterion, and may perform an app review. As a result of the app review, if the app requested to be reviewed conforms to the pre-set criterion, the processor 352 may publish the app so that the registered app may be distributed. Meanwhile, if the app requested to be reviewed does not conform to the pre-set criterion, the processor 352 may reject the registered app.

The storage 353 may store programs, data, or files associated with the app server 350. In addition, the processor 340 may store a plurality of apps usable by the image forming device 300 for each of the multiple platforms.

Hereinafter, even if configurations of the app server 350 are not specified, the image forming device 300 should be construed to encompass all examples that would normally occur to one of ordinary skill in the art. Also, the scope of rights of the present disclosure is not limited to particular configurations or physical/logical structures.

FIG. 4 is a view for explaining a process of controlling an app supported by each platform, by an image forming device supporting multiple platforms, according to an example.

Referring to FIG. 4, the image forming device 300 supporting multiple platforms may request the app server 350 for a list of apps usable by the image forming device 300 in operation 410. In addition, the image forming device 300 may transmit, to the app server 350, information of the multiple platforms supported by the image forming device 300. The information of the multiple platforms supported by the image forming device 300 may be transmitted to the app server 350 in operation 410 or separately.

In operation 420, the image forming device 300 may receive the list from the app server 350. Here, the list may include information of the apps supported by the image forming device 300.

In operation 430, the image forming device 300 may determine a first app to be controlled by the image forming device 300 in the list. For example, the image forming device 300 may display a list including information of apps supported by multiple platforms in the user interface device 320. The image forming device 300 may receive an input to select the first app to be controlled in the image forming device 300 in the list.

In operation 440, the image forming device 300 may obtain information of a second app that provides a same or similar service as the service provided by the first app based on the information of the first app, and is supported by a second platform different from a first platform supporting the first app.

Here, the information of the first app may include information of the service provided by the first app, information of the first platform supporting the first app, information about a state of the first app on the first platform, information about a degree of relevance between similar apps providing the same or similar service as the service provided by the first app and the first app, or the like.

Based on the information of the first app, the image forming device 300 may determine whether there are similar apps that provide a service that is the same or similar to that provided by the first app in the list, and are supported by a platform different from the first platform. As a result of the determination, if there are similar apps providing services that are the same as or similar to the service provided by the first app, the image forming device 300 may group the apps in the list based on the degree of relevance between the similar apps and the first app and display a result of the grouping through the user interface device 320.

The image forming device 300 may display information of the similar apps in an order of a degree of relevance to the service provided by the first app among the services provided by the respective similar apps. Furthermore, the image forming device 300 may display information of a platform supported by each of the similar apps and state information including whether each of the similar apps is installed on the platform.

In operation 450, the image forming device 300 may perform an operation to control a state of the second app on the second platform based on the operation to control the state of the first app on the first platform.

The image forming device 300 may perform an operation to control the state of the first app on the first platform by receiving a first input to control the state of the first app on the first platform. The image forming device 300 may display an execution screen for setting the state of the second app on the second platform based on the first input. The image forming device 300 may perform an operation to control the state of the second app on the second platform by receiving the second input to control the state of the second app on the second platform through the execution screen.

For example, the image forming device 300 may control the second app to be in the second state corresponding to the first state on the second platform while controlling the first app to be in the first state to be controlled on the first platform, or may control the second app to be in the third state opposite to the first state on the second platform.

In another example, if the image forming device 300 cannot control the first app to be in the first state to be controlled on the first platform, the image forming device 300 may control the second app to be in the second state corresponding to the first state on the second platform.

As another example, the image forming device 300 may perform installing or updating of the second app on the second platform when the first app on the first platform is installed or updated, removing the second app from the second platform when the first app is installed or updated on the first platform, installing or updating the second app on the second platform when the first app is removed from the first platform, removing the second app from the second platform when the first app is removed from the first platform, or the like.

FIG. 5 is a view for explaining a process of controlling a state of a second app supported by a second platform by controlling a state of a first app supported by a first platform in an image forming device, according to an example.

Referring to FIG. 5, the image forming device 300 may perform an operation to control the state of the second app on the second platform based on the operation to control the state of the first app on the first platform. The image forming device 300 may control the second app to be in a second state corresponding to a first state on the second platform while controlling the first app to be in the first state to be controlled on the first platform. Meanwhile, the image forming device 300 may control the second app to be in the third state opposite to the first state on the second platform while controlling the first app to be in the first state to be controlled on the first platform.

Referring to operation 510 of FIG. 5, when the first app on the first platform is installed or updated, the image forming device 300 may install or update the second app on the second platform.

Further, when the first app on the first platform is installed or updated, the image forming device 300 may remove the second app on the second platform.

Referring to operation 520 of FIG. 5, when the first app is removed on the first platform, the image forming device 300 may install or update the second app on the second platform.

Further, when the first app is removed on the first platform, the image forming device 300 may remove the second app on the second platform.

FIG. 6 is a view for explaining a process in which an image forming device controls a state of an app supported by each platform according to whether a first app supported by a first platform is installed and a second app supported by a second platform is installed, according to an example.

Referring to FIG. 6, the example process proceeds from operation 440 in which, as described above with reference to FIG. 4, the image forming device 300 may obtain information of the second app that provides a same or similar service as the service provided by the first app based on the information of the first app, and is supported by the second platform different from the first platform supporting the first app.

In operation 610, the image forming device 300 may confirm whether the first app is installed on the first platform from the information of the first app. When the first app is installed on the first platform, the image forming device 300 may perform an operation according to operation 620. When the first app is not installed on the first platform, the image forming device 300 may perform an operation according to operation 630.

In operation 620, the image forming device 300 may confirm whether the second app is installed on the second platform from the information of the second app. When the second app is installed on the second platform, the image forming device 300 may perform an operation according to a flowchart of FIG. 7. When the second app is not installed on the second platform, the image forming device 300 may perform an operation according to a flowchart of FIG. 8.

In operation 630, the image forming device 300 may confirm whether the second app is installed on the second platform from the information of the second app. When the second app is installed on the second platform, the image forming device 300 may perform an operation according to FIG. 9. When the second app is not installed on the second platform, the image forming device 300 may perform an operation according to FIG. 10.

FIG. 7 is a view for explaining a process in which an image forming device controls a state of an app supported by each platform when a first app supported by a first platform and a second app supported by a second platform are installed on the respective platforms, according to an example.

Referring to FIG. 7, the image forming device 300 may determine states of apps installed on each platform to be controlled in operation 710. When an input for updating the apps installed on each platform is received, the image forming device 300 may perform an operation according to operation 720. When an input for removing the apps installed on each platform is received, the image forming device 300 may perform an operation according to operation 750.

In operate 720, the image forming device 300 may confirm whether or not to update the apps installed on all the platforms from the input for updating the apps installed on each platform.

When the input for updating the apps installed on all the platforms is received, the image forming device 300 may update the first app on the first platform in operation 730. In addition, the image forming device 300 may update the second app on the second platform.

When an input for updating only apps installed on a certain platform is received, the image forming device 300 may update only the apps on a selected platform in operation 740.

In operation 750, the image forming device 300 may confirm whether or not to remove the apps installed on all the platforms by the input for removing the apps installed on the platform.

When the input for removing the apps installed on all the platforms is received, the image forming device 300 may remove the first app on the first platform in operation 760.

In addition, the image forming device 300 may remove the second app on the second platform.

When an input for removing only apps installed on a certain platform is received, the image forming device 300 may remove only the apps on the selected platform in operation 770.

FIG. 8 is a view for explaining a process in which an image forming device controls a state of an app supported by each platform when a first app supported by a first platform is installed in the first platform and a second app supported by a second platform is not installed in the second platform, according to an example.

Referring to FIG. 8, the image forming device 300 may determine whether to install the second app on the second platform based on an input determining a state of the second app on the second platform in operation 810.

When the input to install the second app on the second platform is received, the image forming device 300 may determine whether to remove the first app on the first platform based on an input determining the state of the first app on the first platform in operation 820.

When the input to remove the first app on the first platform is received, the image forming device 300 may remove the first app on the first platform and install the second app on the second platform in operation 830.

When an input not to remove the first app on the first platform is received, the image forming device 300 may install the second app on the second platform in operation 840.

When the input not to install the second app on the second platform is received in operation 810, the image forming device 300 may store a setting so that an execution screen for setting the state of the second app is not shown again in operation 850. On the other hand, when the input not to install the second app on the second platform is received in operation 810, the process may simply end.

FIG. 9 is a view for explaining a process in which an image forming device controls a state of an app supported by each platform when a first app supported by a first platform is not installed in the first platform and a second app supported by a second platform is installed in the second platform, according to an example.

Referring to FIG. 9, the image forming device 300 may determine whether to install the first app on the first platform based on an input determining the state of the first app on the first platform in operation 910.

When the input to install the first app on the first platform is received, the image forming device 300 may determine whether to remove the second app on the second platform based on an input determining the state of the second app on the second platform in operation 920.

When the input to remove the second app on the second platform is received, the image forming device 300 may install the first app on the first platform and remove the second app on the second platform in operation 930.

When an input not to remove the second app on the second platform is received, the image forming device 300 may install the first app on the first platform in operation 940.

When the input not to install the first app on the first platform is received in operation 910, the image forming device 300 may store a setting so that an execution screen for setting a state of the first app is not shown again in operation 950. On the other hand, when the input not to install the first app on the first platform is received in operation 910, the process may simply end.

FIG. 10 is a view for explaining a process in which an image forming device controls a state of an app supported by each platform when a first app supported by a first platform and a second app supported by a second platform are not installed on the respective platforms, according to an example.

Referring to FIG. 10, the image forming device 300 may determine whether to install an app supported by each of the platforms on each of the platforms based on an input for determining the state of the app on each of the platforms in operation 1010.

When the input to install the app supported by each of the platforms on each of the platforms is received, the image forming device 300 may install the first app on the first platform and install the second app on the second platform in operation 1020.

When an input to install an app supported by a certain platform is received on a certain platform only, the image forming device 300 may install an app supported by a selected platform on the selected platform in operation 1030.

FIG. 11 is a view for explaining an execution screen displayed on an image forming device when an input for selecting an app supported by a second platform is received in the image forming device, according to an example.

Referring to FIG. 11, the image forming device 300 may receive a list of apps usable by the image forming device 300 from the app server 350. Here, the list may include apps and platform information to which the apps are supported. The image forming device 300 may display the list in the user interface device 320 in the image forming device 300.

As shown in FIG. 11, the user interface device 320 of the image forming device 300 may receive an input 1110 for selecting B app supported by the second platform. In more detail, the user interface device 320 may receive the input 1110 for selecting "B app for the second platform." The user interface device 320 may display information 1130 about the B app supported by the second platform upon receiving the input 1110 for selecting "B app for the second platform." For example, the information about the B app may include information about a platform to which the B app is supported, version information of the B app, a developer of the B app, a file name when the B app is downloaded, similar apps that provide the same or similar service as a service provided by the B app, or the like.

Furthermore, as shown in FIG. 11, the user interface device 320 may display information about the B app supported by the first platform different from the second platform with respect to the "B app for the second platform." In more detail, the user interface device 320 may display a pop-up window 1120 that includes a phrase such as "the selected B app may be supported by the first platform." In this case, as the "B app for the second platform" is selected, a check box may be provided in the pop-up window 1120 to select "Don't show this again" for the information of the "B app for the first platform."

When the user interface device 320 receives an input for selecting "install a selected platform" in the pop-up window 1120, the image forming device 300 may download a file of the "B App for the second platform" from the app server 350 and install the "B app for the second platform" on the second platform. Meanwhile, when the user interface device 320 receives an input for selecting "install another platform" in the pop-up window 1120, the image forming device 300 may download a file of the "B App for the first platform" from the app server 350 and install the "B app for the first platform" on the first platform.

FIG. 12 is a view for explaining an execution screen displayed on an image forming device when an input for selecting an app supported by a second platform is received in the image forming device, according to another example.

Referring to FIG. 12, the image forming device 300 may display a list of apps usable by the image forming device 300 through the user interface device 320. The user interface device 320 may receive an input 1210 for selecting the B app supported by the second platform and may display information 1230 about the B app supported by the second platform. Here, the information is the same as the "information about the B app."

As shown in FIG. 12, the user interface device 320 may display information of a platform supported in the image forming device 300 with respect to the selected B app. In more detail, the user interface device 320 may display a pop-up window 1220 that includes a phrase such as "selected apps may be updated." A check box may be provided in the pop-up window 1120 to select "update the B app Installed on the first platform" and "update the B app installed on the second platform." Furthermore, as shown in FIG. 12, a "current platform" indicates a platform on which the image forming device 300 is currently operating.

When the user interface device 320 receives an input for selecting "update all" in the pop-up window 1220, the image forming device 300 may update the B app installed on the first platform and update the B App installed on the second platform. In addition, when the user interface device 320 receives an input for selecting "update" in the pop-up window 1220, the image forming device 300 may update the B app installed on a selected platform only.

FIG. 13 is a view for explaining an execution screen for displaying information of apps supported by each of multiple platforms when an input for selecting a certain app in a list output from an image forming device is received, according to an example.

Referring to FIG. 13, the user interface device 320 of the image forming device 300 may display a list of apps usable by the image forming device 300. As shown, the user interface device 320 may display a list including information of "A app", "B app", "C app", "D app", and "E app usable by the image forming device 300 in operation 1310.

The user interface device 320 may display information of the "B app" supported by each of the platforms supported by the image forming device 300 upon receiving an input 1311 for selecting the "B app." As shown, the user interface device 320 may display "B app for the first platform" 1321 and "B app for the second platform" 1322 indicating that the B app is supported by both the first platform and the second platform in operation 1320.

FIG. 14 is a view for explaining an execution screen that is set for displaying one representative app from among certain apps providing an identical service in an image forming device, according to an example.

Referring to FIG. 14, the user interface device 320 of the image forming device 300 may display apps installed in the image forming device 300 as icons in operation 1410. The user interface device 320 may display a pop-up window 1420 for grouping apps providing an identical service or similar services to apps supported by multiple platforms and setting a representative app of the apps.

As shown in FIG. 14, "app 2 for first platform" and "app 2 for second platform" provide an identical service. The user interface device 320 may display the pop-up window 1420 that sets one of the "app 2 for first platform" and "app 2 for second platform" as the representative app. A user may input an input for selecting the representative app for an app for a platform that is frequently used among the first platform and the second platform. For example, the user interface device 320 may receive the "app 2 for first platform" that selects the second most frequently used app 2 on the first platform rather than on the second platform. The image forming device 300 may set the "app 2 supported on the first platform" to the icon for the "app 2." Thereafter, when an input for executing the "app 2" is received in the image forming device 300, the image forming device 300 may execute the app 2 on the first platform.

The examples of the present disclosure can be written as computer programs and can be implemented in general-use digital computers that execute the programs using a non-transitory computer-readable recording medium. In addition, a data structure used in the examples of the present disclosure can be written in a non-transitory computer-readable recording medium through various means. The one or more examples may be embodied as computer readable code/instructions on a recording medium, e.g., a program module to be executed in computers, which include computer-readable commands. For example, methods that are implemented as software modules or algorithms may be stored as computer readable code or program instructions executable on a non-transitory computer-readable recording medium.

The non-transitory computer-readable recording medium may include any usable medium that may be accessed by computers, volatile and non-volatile medium, and detachable and non-detachable medium. Examples of the non-transitory computer-readable recording medium include, but are not limited to, magnetic storage media (e.g., ROM, floppy disks, hard disks, etc.), optical recording media (e.g., CD-ROMs, or DVDs), etc. Also, the non-transitory computer-readable recording medium may include a computer storage medium and a communication medium.

The non-transitory computer-readable recording media can be distributed over network-coupled computer systems, and data stored in the distributed recording media, e.g., a program command and code, may be executed by using at least one computer.

Although the examples have been described with reference to the accompanying drawings, those of ordinary skill in the art will understand that various changes and modifications may be made therein. For example, the relevant results may be achieved even when the described technologies are performed in a different order than the described methods, and/or even when the described elements such as systems, structures, devices, and circuits are coupled or combined in a different form than the described methods or are replaced or substituted by other elements or equivalents.

Therefore, the scope of the present disclosure should be defined not by the described examples alone, but by the appended claims and the equivalents thereof.

The invention claimed is:

1. An image forming device comprising:
 a communication device to communicate with an app server;
 a processor;
 a memory storing instructions executable by the processor; and
 a user interface device to receive a user input and to display information related to the image forming device,
 wherein the processor is to execute the instructions to:
  request the app server for a list of apps usable by the image forming device supporting multiple platforms, and receive the list from the app server;

determine a first app to be controlled by the image forming device in the list;
obtain information of a second app that provides a same or similar service as a service provided by the first app based on information of the first app, and is supported by a second platform different from a first platform supporting the first app; and
perform an operation to control a state of the second app on the second platform based on an operation to control a state of the first app on the first platform including controlling the second app to be in a second state corresponding to a first state on the second platform while controlling the first app to be in the first state to be controlled on the first platform or control the second app to be in a third state opposite to the first state on the second platform while controlling the first app to be in the first state to be controlled on the first platform.

2. The image forming device of claim 1, wherein the information of the first app comprises at least one of information of the service provided by the first app, information of the first platform supporting the first app, information about the state of the first app on the first platform, or information about a degree of relevance between similar apps providing the same or similar service as the service provided by the first app and the first app.

3. The image forming device of claim 1, wherein the processor is to further execute the instructions to, through the user interface device:
control the state of the first app on the first platform by receiving a first input to control the state of the first app on the first platform;
display an execution screen for setting the state of the second app on the second platform based on the first input; and
control the state of the second app on the second platform by receiving a second input to control the state of the second app on the second platform through the execution screen.

4. The image forming device of claim 1, wherein the processor is to further execute the instructions to:
transmit, to the app server, information of the multiple platforms supported by the image forming device; and
receive the list comprising the information of the apps supported by the multiple platforms from the app server.

5. The image forming device of claim 1, wherein the processor is to further execute the instructions to, through the user interface device:
display the list comprising the information of apps supported by the multiple platforms; and
receive an input to select the first app to be controlled by the image forming device in the list.

6. The image forming device of claim 1, wherein the processor is to further execute the instructions to:
determine whether there are similar apps that provide a service that is the same or similar to that provided by the first app in the list based on the information of the first app, and are supported by a platform different from the first platform; and
when it is determined, as a result of the determination, that there are similar apps providing services that are the same as or similar to the service provided by the first app, group the apps in the list based on a degree of relevance between the similar apps and the first app, and display a result of the grouping through the user interface device.

7. The image forming device of claim 6, wherein the processor is to further execute the instructions to, through the user interface device:
display information of the similar apps in an order of a degree of relevance to the service provided by the first app among the services provided by the respective similar apps; and
display information of a platform supported by each of the similar apps and state information about whether each of the similar apps is installed on the platform.

8. The image forming device of claim 1, wherein the processor is to further execute the instructions to at least one of:
install or update the second app on the second platform when the first app is installed or updated on the first platform;
remove the second app from the second platform when the first app is installed or updated on the first platform;
install or update the second app on the second platform when the first app is removed from the first platform; or
remove the second app from the second platform when the first app is removed from the first platform.

9. A non-transitory computer-readable storage medium having recorded thereon instructions executable by a processor, the non-transitory computer-readable storage medium comprising:
instructions to request an app server for a list of apps usable by an image forming device supporting multiple platforms, and receive the list from the app server;
instructions to determine a first app to be controlled by the image forming device in the list;
instructions to obtain information of a second app that provides a same or similar service as a service provided by the first app based on information of the first app, and is supported by a second platform different from a first platform supporting the first app; and
instructions to control the state of the second app on the second platform, based on the operation to control the state of the first app on the first platform including controlling the second app to be in a second state corresponding to a first state on the second platform while controlling the first app to be in the first state to be controlled on the first platform or control the second app to be in a third state opposite to the first state on the second platform while controlling the first app to be in the first state to be controlled on the first platform.

10. The non-transitory computer-readable storage medium of claim 9, wherein the information of the first app comprises at least one of information of the service provided by the first app, information of the first platform supporting the first app, information about the state of the first app on the first platform, or information about a degree of relevance between similar apps providing the same or similar service as the service provided by the first app and the first app.

11. The non-transitory computer-readable storage medium of claim 9, further comprising at least one of:
instructions to install or update the second app on the second platform when the first app is installed or updated on the first platform;
instructions to remove the second app from the second platform when the first app is installed or updated on the first platform;
instructions to install or update the second app on the second platform when the first app is removed from the first platform; or instructions to remove the second app from the second platform when the first app is removed from the first platform.

12. An image forming device supporting multiple platforms, the image forming device comprising:
a communication device to communicate with an app server;
a processor;
a memory storing instructions executable by the processor; and
a user interface device to receive a user input and to display information related to the image forming device,
wherein the processor is to execute the instructions to:
request the app server for a list of apps usable by the image forming device and receive the list from the app server;
determine a first app to be controlled by the image forming device in the list;
determine whether there are similar apps that provide a service that is the same or similar to that provided by the first app in the list based on information of the first app, and are supported by a platform different from a first platform supporting the first app;
when it is determined that there are similar apps providing services that are the same as or similar to the service provided by the first app, group the apps in the list based on a degree of relevance between the similar apps and the first app, and display a result of the grouping through the user interface device;
obtain information of a second app that provides a same or similar service as the service provided by the first app based on the information of the first app, the second app supported by a second platform different from the first platform; and
perform an operation to control a state of the second app on the second platform based on an operation to control a state of the first app on the first platform.

13. The image forming device of claim 12, wherein the processor is to further execute the instructions to:
control the second app to be in a second state corresponding to a first state on the second platform while controlling the first app to be in the first state to be controlled on the first platform; or
control the second app to be in a third state opposite to the first state on the second platform while controlling the first app to be in the first state to be controlled on the first platform.

14. The image forming device of claim 12, wherein the processor is to further execute the instructions to:
control the second app to be in a second state corresponding to a first state on the second platform when the processor cannot control the first app to be in the first state to be controlled on the first platform.

15. The image forming device of claim 12, wherein the information of the first app comprises at least one of information of the service provided by the first app, information of the first platform supporting the first app, information about the state of the first app on the first platform, or information about a degree of relevance between similar apps providing the same or similar service as the service provided by the first app and the first app.

16. The image forming device of claim 12, wherein the processor is to further execute the instructions to, through the user interface device:
control the state of the first app on the first platform by receiving a first input to control the state of the first app on the first platform;
display an execution screen for setting the state of the second app on the second platform based on the first input; and
control the state of the second app on the second platform by receiving a second input to control the state of the second app on the second platform through the execution screen.

17. The image forming device of claim 12, wherein the processor is to further execute the instructions to:
transmit, to the app server, information of the multiple platforms supported by the image forming device; and
receive the list comprising the information of the apps supported by the multiple platforms from the app server.

18. The image forming device of claim 12, wherein the processor is to further execute the instructions to, through the user interface device:
display the list comprising the information of apps supported by the multiple platforms; and
receive an input to select the first app to be controlled by the image forming device in the list.

19. The image forming device of claim 12, wherein the processor is to further execute the instructions to, through the user interface device:
display information of the similar apps in an order of a degree of relevance to the service provided by the first app among the services provided by the respective similar apps; and
display information of a platform supported by each of the similar apps and state information about whether each of the similar apps is installed on the platform.

20. The image forming device of claim 12, wherein the processor is to further execute the instructions to at least one of:
install or update the second app on the second platform when the first app is installed or updated on the first platform;
remove the second app from the second platform when the first app is installed or updated on the first platform;
install or update the second app on the second platform when the first app is removed from the first platform; or
remove the second app from the second platform when the first app is removed from the first platform.

* * * * *